United States Patent
Wu (10) Patent No.: US 10,830,409 B2
(45) Date of Patent: Nov. 10, 2020

(54) LIGHT SOURCE MODULE AND PROJECTION DEVICE

(71) Applicant: APPOTRONICS CHINA CORPORATION, Shenzhen (CN)

(72) Inventor: Xiliang Wu, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/312,050

(22) PCT Filed: May 6, 2015

(86) PCT No.: PCT/CN2015/078354
§ 371 (c)(1),
(2) Date: Nov. 17, 2016

(87) PCT Pub. No.: WO2015/176608
PCT Pub. Date: Nov. 26, 2015

(65) Prior Publication Data
US 2017/0097562 A1    Apr. 6, 2017

(30) Foreign Application Priority Data
May 19, 2014 (CN) .................... 2014 2 0256311 U (51) Int. Cl.
*F21V 5/00* (2018.01)
*G03B 21/20* (2006.01)
(Continued)

(52) U.S. Cl.
CPC ............ *F21V 5/007* (2013.01); *F21V 7/0083* (2013.01); *F21V 9/14* (2013.01); *F21V 13/14* (2013.01);
(Continued)

(58) Field of Classification Search
None
See application file for complete search history.

(56) References Cited

U.S. PATENT DOCUMENTS 6,893,130 B2 * 5/2005 Pentico ................ H04N 9/3105
348/E9.027
7,738,178 B2   6/2010 Bartoschewski et al.
(Continued)

FOREIGN PATENT DOCUMENTS

CN    101273504 A    9/2008
CN    101772722 A    7/2010
(Continued)

OTHER PUBLICATIONS

International Search Report in the parent PCT application No. PCT/CN2015/078354, dated Aug. 14, 2015.
(Continued)

*Primary Examiner* — Britt D Hanley
(74) *Attorney, Agent, or Firm* — Chen Yoshimura LLP (57) ABSTRACT

A light source module includes a light source array, a lens array arranged corresponding to the light source array, a condensing lens covering partial regions of the light source array and the lens array, and a reflecting mirror array positioned between the condensing lens and the lens array. The reflecting mirror array includes multiple reflecting mirrors, or multiple reflecting mirrors and polarizing filters. A light path of light beam emitted by each light source of the light source array not covered by the condensing lens is provided with at least two reflecting mirrors, or at least one reflecting mirror and one polarizing filter. The last reflecting mirror or the polarizing filter in each light path is positioned in the area covered by the condensing lens, and accordingly a light beam which can not be directly incident to the condensing lens is transmitted to the condensing lens.

7 Claims, 5 Drawing Sheets

(51) Int. Cl.
- *G02B 27/10* (2006.01)
- *G02B 27/14* (2006.01)
- *F21V 7/00* (2006.01)
- *F21V 9/14* (2006.01)
- *F21V 13/14* (2006.01)
- *F21Y 105/10* (2016.01)

(52) U.S. Cl.
CPC .......... *G02B 27/106* (2013.01); *G02B 27/14* (2013.01); *G02B 27/143* (2013.01); *G03B 21/20* (2013.01); *G03B 21/208* (2013.01); *G03B 21/2066* (2013.01); *G03B 21/2073* (2013.01); *F21Y 2105/10* (2016.08)

(56) References Cited

U.S. PATENT DOCUMENTS

| | | |
|---|---|---|
| 8,262,235 B2 | 9/2012 | Konno |
| 2004/0141220 A1 | 7/2004 | Hama et al. |
| 2006/0164607 A1 | 7/2006 | Morejon et al. |
| 2008/0198893 A1 | 8/2008 | Bartoschewski et al. |
| 2011/0235003 A1 | 9/2011 | Konno |

FOREIGN PATENT DOCUMENTS

| | | |
|---|---|---|
| CN | 103091845 A | 5/2013 |
| CN | 203069883 U | 7/2013 |
| CN | 203217229 U | 9/2013 |
| CN | 203930191 U | 11/2014 |
| EP | 2175305 A1 | 4/2010 |
| JP | H07-301764 A | 11/1995 |
| JP | 2004-219480 A | 8/2004 |
| JP | 2007-140263 A | 6/2007 |
| JP | 2008-028019 A | 2/2008 |
| WO | 2007-019878 A1 | 2/2007 |
| WO | 2013060509 A1 | 5/2013 |

OTHER PUBLICATIONS

IPRP in the parent PCT application No. PCT/CN2015/078354, dated Nov. 22, 2016.

Extended European Search Report, dated Dec. 4, 2017 in corresponding application EP 15795916.4.

Japanese Office Action, dated Sep. 26, 2017 in a counterpart Japanese patent application, No. JP 2016-567773.

Japanese Office Action, dated Apr. 3, 2018 in a counterpart Japanese patent application, No. JP 2016-567773.

Korean Office Action, dated Sep. 20, 2017 in a counterpart application KR 10-2016-7035273.

* cited by examiner

LIGHT SOURCE MODULE AND PROJECTION DEVICE

BACKGROUND OF THE INVENTION

Field of the Invention

This invention relates to optical technologies, and in particular, it relates to a light source module and related projection device.

Description of Related Art

Due to its long life, high image brightness and richness of color, laser projectors are widely used in recent years in projection televisions, micro-projectors and home entertainment systems. Most current laser projectors use laser light sources to emit an excitation light, and shine the excitation light on different wavelength conversion materials of a phosphor wheel, to sequentially excite the wavelength conversion materials to generate red, blue and green converted lights, and then combine the different color converted lights into one light beam to be used for images projection display.

Figure 1:
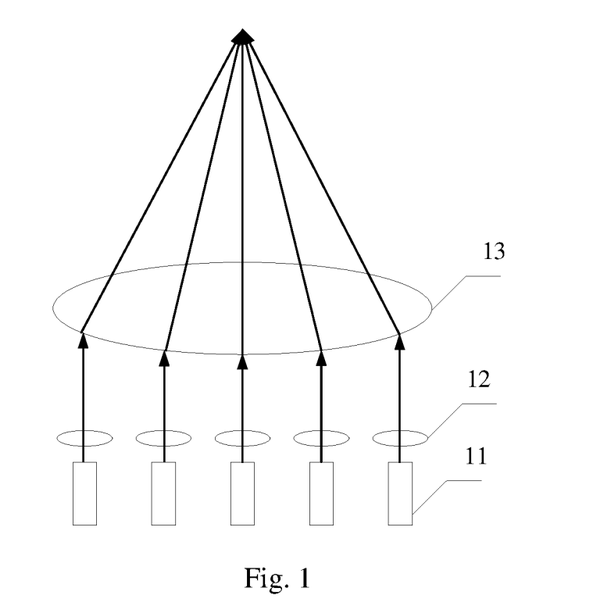
FIG. 1 illustrates the structure of a conventional light source module of a projection device.

In a conventional projection device, the light source module has a structure shown in FIG. 1, which includes a light source array 11 and a lens array 12 corresponding to the light source array 11. Each lens corresponds to one light source to condense and collimate the output light of the light source, so the output light of each light source is collimated into a parallel light beam. The projection device further includes a focusing lens 13, for focusing the collimated parallel light beams, and directing the focused light beams to downstream phosphor wheel and other optical components, to excite the phosphors to generate different color lights to be used for image display.

However, in such a projection device, the focusing lens 13 need to approximately cover the entire area of the light source array 11 in order to focus the light beams from all light sources. Therefore, the focusing lens needs to have a relatively large size. This cannot satisfy some projection applications which require compact sizes.

Figure 2:
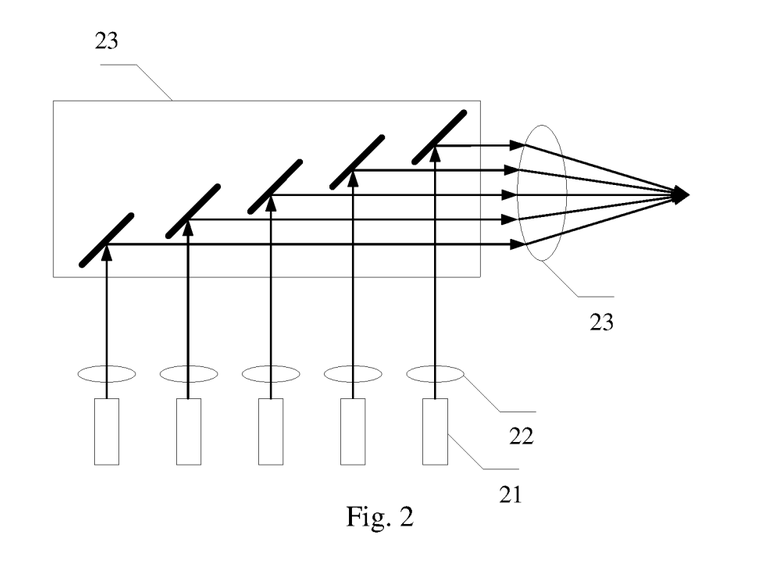
FIG. 2 illustrates the structure of another conventional light source module of a projection device.

Another light source module for projection device has been proposed, as shown in FIG. 2, where a reflector is provided on the output beam path of each light source. In this device, a step shaped reflector array 24 is provided between a lens array 22 which corresponds to the light source array 21 and a focusing lens 23. Each reflector of the array reflects the output beam of one light source. Although this projection device can reduce the distances between light beams, therefore allowing a relatively small focusing lens to be used, the sizes of focusing lens and the projection device still cannot satisfy the strict requirements of some applications.

SUMMARY

Accordingly, the present invention is directed to a light source module and a projection device which solve the problem of conventional technologies, i.e. the problem of large focusing lenses that cannot satisfy the size requirement of some projection applications.

To achieve these goals, the present invention provides a light source module, which includes a light source array and a lens array corresponding to the light source array, and further includes:

a focusing lens covering a partial area of the light source array and the lens array; and a reflector array located between the focusing lens and the lens array, the reflector array including multiple reflectors or multiple reflectors and polarization filters, wherein at least two reflectors or at least one reflector and one polarization filter are located on an output beam path of each light source of the light source array not covered by the focusing lens, and wherein the most downstream reflector or polarization filter on each output beam path is located in the area covered by the focusing lens.

Preferably, the light source array includes M rows and N columns of light sources, and wherein in one row or one column of the light source array, the focusing lens covers a single light source located in a center area or two adjacent light sources.

Preferably, when the reflector array includes multiple reflectors, two reflectors are located on the output beam path of each of the light sources not covered by the focusing lens.

Preferably, the second ones of the two reflectors respectively located on output beam paths of multiple light sources on a same side of the optical axis of the focusing lens are the same reflector.

Preferably, when the reflector array includes multiple reflectors and polarization filters, at least one reflector and one polarization filter are located on the output beam path of each of the light sources not covered by the focusing lens.

Preferably, the polarizing filters respectively located on the output beam paths of all of the light sources not covered by the focusing lens are the same polarizing filter.

Preferably, only one reflector is located on the output beam path of each light source located on one side of the optical axis of the focusing lens, and two reflectors are located on the output beam path of each light source located on another side of the optical axis of the focusing lens.

Preferably, two first reflectors respectively located on the output beam paths of two light sources, the two light sources being not covered by the focusing lens and being located symmetrically about an optical axis of the focusing lens, are located symmetrically about the optical axis of the focusing lens.

Preferably, a diameter of the focusing lens is between 6 mm and 7 mm.

A projection device which employs any of the above described light source module.

Compared to conventional technologies, the technical scheme of the present invention has the following advantages:

In the light source module and projection device according to embodiments of the present invention, at least two reflectors, or at least one reflector and one polarizing filter, are provided on the output beam path of each light source that is not covered by the focusing lens. Further, the last reflector or polarizing filter on each beam path is located in an area covered by the focusing lens, to reflect the light beams that cannot directed enter the focusing lens into the focusing lens. Because the focusing lens does not have to cover the entire area of the light source array and can still focus the light beams from all light sources, the focusing lens can have a relatively small size, which can better satisfy the requirement of practical applications, making it more useful in projection devices.

BRIEF DESCRIPTION OF THE DRAWINGS

To more clearly explain embodiments of the present invention as well as conventional technology, the following drawings are used. The drawings only illustrate some embodiments of the invention; it should be appreciated that those of ordinary skill in the art can realize other drawings without undue experimentation.

DETAILED DESCRIPTION OF PREFERRED EMBODIMENTS

As mention above, in the light source module shown in FIG. 1, the focusing lens 13 needs to approximately cover the entire area of the light source array 11 in order to focus the light beams emitted from all light sources. Therefore, the focusing lens 13 needs to have a relatively large size, and the projection device also has a relatively large size which is undesirable for some applications.

Therefore, embodiments of the present invention provides a light source module which overcomes the above problems of the conventional technologies, the light source module including a light source array and a lens array corresponding to the light source array, and further including:

a focusing lens covering a partial area of the light source array and the lens array, and a reflector array located between the focusing lens and the lens array, the reflector array including multiple reflectors or multiple reflectors and polarization filters, where at least two reflectors or at least one reflector and one polarization filter are located on an output beam path of each light source of the light source array not covered by the focusing lens, and where the most downstream reflector or polarization filter on each output beam path is located in the area covered by the focusing lens.

An embodiment of the present invention also provides a projection device which employs any of the above described light source module.

In the light source module and projection device according to embodiments of the present invention, at least two reflectors, or at least one reflector and one polarizing filter, are provided on the output beam path of each light source that is not covered by the focusing lens. Further, the last reflector or polarizing filter on each beam path is located in an area covered by the focusing lens, to reflect the light beams that cannot directed enter the focusing lens into the focusing lens. Because the focusing lens does not have to cover the entire area of the light source array and can still focus the light beams from all light sources, the focusing lens can have a relatively small size, which can better satisfy the requirement of practical applications, making it more useful in projection devices.

The above are the design principles of the embodiments of the present invention. In order to better illustrate the above purposes, characteristics and advantages of the invention, the embodiments of the present invention are described in more detail below with reference to the drawings.

While details are described below to aid in the understanding of this invention, the invention can be implemented in many other ways not described below. Those skilled in the art can made modification and variations without departing from the spirit and scope of the invention. Thus, the invention is not limited to the specific embodiments described below.

Further, the embodiments of the invention are described in detail with reference to the drawings; for ease of illustrate, the structures in the drawings are necessarily to scale, and the drawings are only for purpose of illustration and do not limit the scope of the invention. Also, in actual practice, the structures are three-dimensional including length, width and depth.

The embodiments are described in detail below.

First Embodiment

Figure 3:
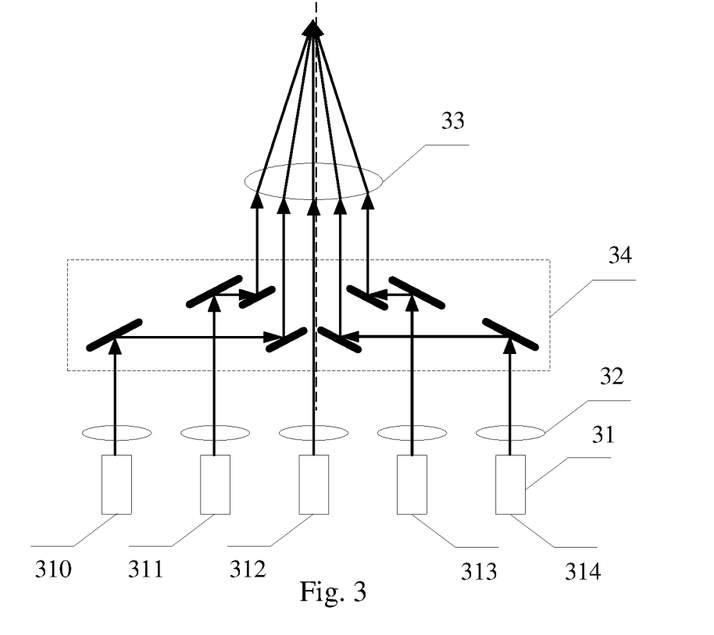
FIG. 3 illustrates the structure of a light source module according to a first embodiment of the present invention.

This embodiment provides a light source module, as shown in FIG. 3, which includes a light source array 31 that includes multiple light sources, and a lens array 32 corresponding to the light source array 31, where each lens of the lens array 32 corresponds to one light source of the light source array 31 to condense and collimate the output light of the light source.

The light source module in this embodiment further includes a focusing lens 33 that partially covers the light source array 31 and the lens array 32. The diameter of the focusing lens 33 ranges from 6 mm to 7 mm, and is preferably 6.5 mm. The light source module further includes a reflector array 34 located between the focusing lens 33 and the lens array 32, where the reflector array 34 includes multiple reflectors. For each light source of the light source array 31 that is not covered by the focusing lens 33, two reflectors are provided on its output beam path, and the most downstream reflector on each beam path is located in the area covered by the focusing lens 33.

In this embodiment, the light source array 31 has M rows and N columns of light sources, and the values of M and N may be determined based on need. FIG. 3 uses only one row or one column of light sources to illustrate the structure and principle of the light source module of this embodiment. The same applies to the drawings for other embodiments.

In this embodiment, the focusing lens 33 covers a single light source 312 located in a center area of the row or column. As shown in FIG. 3, the output beam of the light source 312 that is covered by the focusing lens 33 directly enters the focusing lens 33, while the output beams of the light sources 310, 311, 313 and 314 that are not covered by the focusing lens 33 cannot directly enter the focusing lens 33 without the reflectors. Thus, in order to direct the output beams of the light sources that are not covered by the focusing lens 33 into the focusing lens 33, and to make the distances between the light beams that enter the focusing lens 33 relatively small, in this embodiment, two reflectors are provide on the beam path of each light source that is not covered by the focusing lens 33. The first reflector on each output beam path is located in the output direction of the collimated light generated by the lens array 32, to reflect the collimated beam to the second reflector which is located in an area covered by the focusing lens 33, and the second reflector reflects the beam to the focusing lens 33.

Of course, in other embodiments, the second reflector on the beam path of any one of the light source not covered by the focusing lens 33 may be replaced by a polarizing filter.

In such a case, one reflector and one polarizing filter are provided on that beam path, where the polarizing filter is located in the area covered by the focusing lens 33 to reflect the corresponding beam to the focusing lens 33. Moreover, the second reflector on the beam path of any one of the light source not covered by the focusing lens 33 may be replaced by another optical component, so long as it can reflect the corresponding beam to the focusing lens 33.

In this embodiment, to ensure that each beam enters the focusing lens 33, and to minimize the distances between the light beams that enter the focusing lens 33, so that the focusing lens 33 can focus all beams to the desired output direction and position in order to achieve downstream functions of generation of different color converted lights and image display, the following are preferred: the first reflectors located on different beam paths on the same side of the optical axis of the focusing lens 33 (the dashed line in FIG. 3) have relatively small height differences in the vertical direction, the second reflector and the first reflector on the same beam path have the same height, and the height differences of the second reflectors on different beam paths are also relatively small, as shown in FIG. 3.

When the number of light sources in the row or column is odd, and the light source covered by the focusing lens 33 is a single light source located at the center, as shown in FIG. 3, the light sources not covered by the focusing lens 33 are symmetrically located on the two sides of the optical axis of the focusing lens 33. In this case, the two first reflectors of two symmetrically located light sources may be symmetrically located, and the two second reflectors may also be symmetrically located. E.g., the two reflectors of the light source 310 and light source 314 are symmetrically located, and the two reflectors of the light source 311 and light source 313 are symmetrically located. Of course, in other embodiments, the distances and distributions of the reflectors can be modified based on practical need, and they are not limited to those shown in FIG. 3.

In the light source module of this embodiment, two reflectors are provided on the output beam path of each light source that is not covered by the focusing lens, and the most downstream one of the reflectors on each beam path is located in the area covered by the focusing lens, to direct the beam that cannot directly enter the focusing lens into the focusing lens. Because the focusing lens does not need to cover the entire area of the light source array and can still focus all the output beams, the focusing lens of this embodiment can have a relative small size, which is more suitable for practical requirements, making it more useful for projection devices. Moreover, as compared to the light source modules of FIG. 2, the height of the reflector array in this embodiment is reduced by a half, and the sizes of the focusing lens and the light source module are further reduced, making it more suitable for applications with strict size requirements.

Second Embodiment

Figure 4:
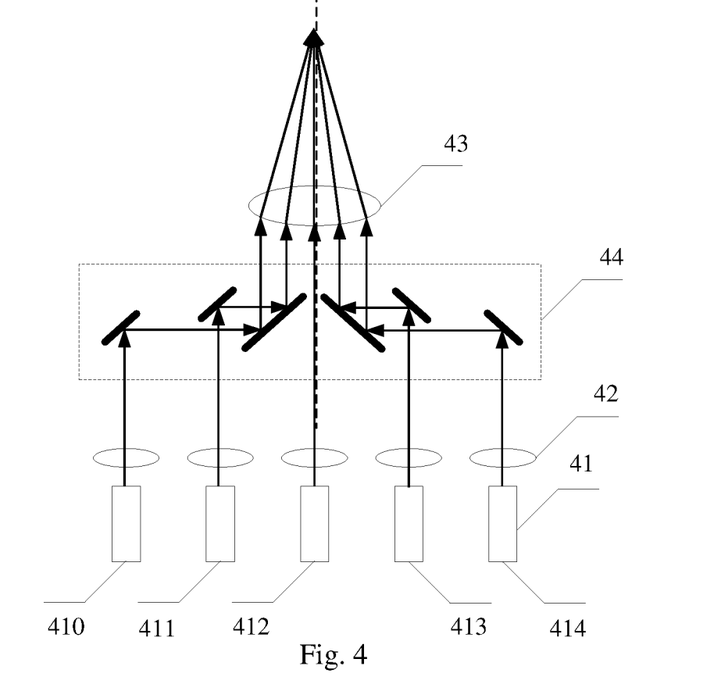
FIG. 4 illustrates the structure of a light source module according to a second embodiment of the present invention.

This embodiment provides a light source module, as shown in FIG. 4, where the light source array 41, the lens array 42 and the focusing lens 43 are the same as those in the first embodiment, and two reflectors are provided on the output beam path of each light source that is not covered by the focusing lens 43 to direct the output beam to the focusing lens 43. A difference between this embodiment and the first embodiment is that the second reflectors on different output beam paths located on the same side of the optical axis of the focusing lens 43 are the same reflector.

As shown in FIG. 4, the output beam of the light source 412 directly enters the focusing lens 43; the first reflectors on the output beam paths of the light sources 410 and 411, which are located on the same side of the optical axis of the focusing lens 43, are respectively 4101 and 4111, and the second reflectors are both 4102. I.e., the output beam of the light source 410 is reflected by the reflector 4101 onto the reflector 4102 which is located in the area covered by the focusing lens 43, and is reflected by the reflector 4102 into the focusing lens 43; the output beam of the light source 411 is reflected by the reflector 4111 onto the reflector 4102 which is located in the area covered by the focusing lens 43, and is reflected by the reflector 4102 into the focusing lens 43. The beams from different beam paths are incident on different locations of the same reflector, which can be realized by adjusting the heights of the first reflectors of the different beam paths. This forms parallel beams with certain distances between them, which are then focused by the focusing lens 43. Similarly, the spatial relationship between the beam paths and reflectors of light sources 413 and 414, which are located on the other side of the optical axis of the focusing lens 43, are similar to the above and not described in detail.

In other embodiment, the second reflector on the beam path of any one of the light sources not covered by the focusing lens 43 may be replaced by a polarizing filter; e.g., the reflector 4102 may be replaced by a polarizing filter, or other optical components, so long as it can reflect the corresponding light beam to the focusing lens 43.

In this embodiment, the light source covered by the focusing lens 43 is a single light source located at the center, and the two reflectors respectively on the beam paths on the two sides of the optical axis of the focusing lens 43 are symmetrically located; for example, the two reflectors on the beam path of the light source 410 and the two reflectors on the beam path of the light source 414 are respectively symmetrically located relative to each other, the two reflectors on the beam path of the light source 411 and the two reflectors on the beam path of the light source 413 are respectively symmetrically located relative to each other.

In the light source module of this embodiment, two reflectors are provided on the output beam path of each light source that is not covered by the focusing lens, to direct the light beam that cannot directly enter the focusing lens into the focusing lens. Because the focusing lens does not need to cover the entire area of the light source array and can still focus all the output light beams, the focusing lens of this embodiment can have a relative small size, which can satisfy the practical requirements and makes it more suitable for projection devices.

Further, because the second reflectors on different output beam paths located on the same side of the optical axis of the focusing lens are the same reflector, the number of reflectors is reduced, which reduces cost. Moreover, as compared to the light source modules of FIG. 2, the height of the reflector array in this embodiment is reduced by a half, which further reduces the sizes of the focusing lens, making it more suitable for applications with strict size requirements.

Third Embodiment

Figure 5:
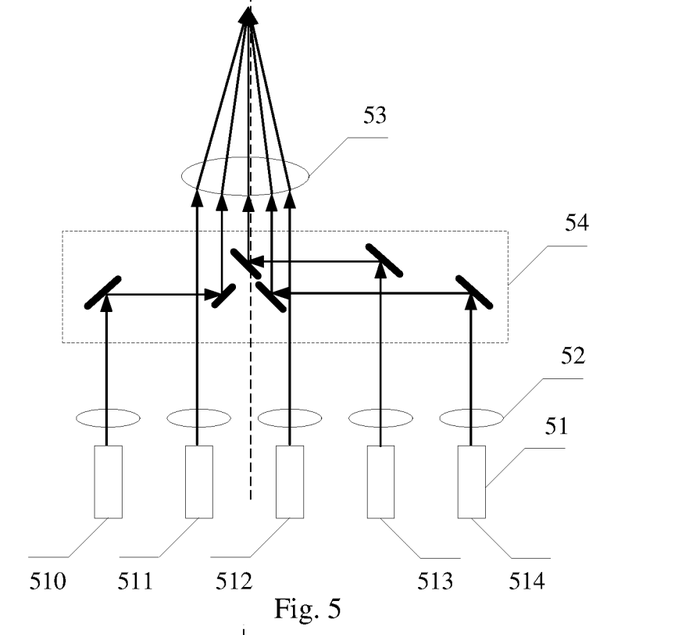
FIG. 5 illustrates the structure of a light source module according to a third embodiment of the present invention.

This embodiment provides a light source module, as shown in FIG. 5, where the light source array 51, the lens array 52 and the focusing lens 53 are the same as those in the first embodiment, and two reflectors are provided on the output beam path of each light source that is not covered by the focusing lens 53 to direct the output beam to the focusing lens 53. Further, in other embodiments, the second reflector on the beam path of any one of the light sources not covered by the focusing lens 53 may be replaced by a polarizing filter or another optical component that has a reflecting function. A difference between this embodiment and the first embodiment is that, in the first embodiment, the focusing lens 33 covers a single light source located in a center area of the row or column of light sources, while in this embodiment, the focusing lens 53 covers two adjacent light sources of the row or column of light sources, such as the light sources 511 and 512 as shown in FIG. 5.

As shown in FIG. 5, the output beams of the light sources 511 and 512 directly enter the focusing lens 53, and the output beams of the light sources 510, 513 and 514 are each respectively directed by two reflectors to enter the focusing lens 53. To minimize the distances between the light beams that enter the focusing lens 53, the first reflectors on the beam paths of the light sources 513 and 514, which are located on the same side of the optical axis of the focusing lens 53, have a relatively small height difference, so that the distance between reflected beams is minimized, which in turn reduces the distances between the parallel beams entering the focusing lens 53. The two reflectors on the beam path of the light source 510 may be symmetrically located relative to the two reflectors on the beam path of the light source 514, but the locations are not limited by this embodiment.

As compared to the light source module of the first embodiment, the light source module of this embodiment reduces the size of the focusing lens, and at the same time, by covering two adjacent light sources with the focusing lens, reduces the number of reflectors, which reduces cost and simplifies the structure.

Fourth Embodiment

Figure 6:
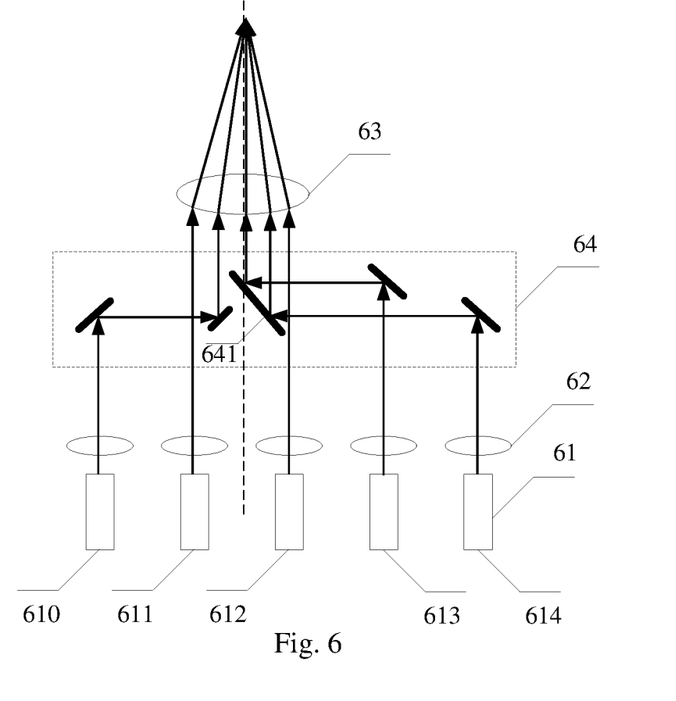
FIG. 6 illustrates the structure of a light source module according to a fourth embodiment of the present invention.

This embodiment provides a light source module, as shown in FIG. 6, where the light source array 61, the lens array 62 and the focusing lens 63 are the same as those in the third embodiment. One difference is that in this embodiment, the second reflectors on different output beam paths located on the same side of the optical axis of the focusing lens are the same reflector. As shown in FIG. 6, the second reflectors on the output beam paths of the light sources 613 and 614, which are located on the same side of the optical axis of the focusing lens 63, are both the same reflector 641. Similarly, the second reflector on the beam path of any one of the light sources not covered by the focusing lens 63 may be replaced by a polarizing filter or another optical component that has a reflecting function. For example, the reflector 641 may be a polarizing filter.

As compared to the light source module of the third embodiment, the light source module of this embodiment reduces the size of the focusing lens, and at the same time, by using the same reflector as the second reflectors on adjacent output beam paths located on the same side of the optical axis of the focusing lens, it reduces the number of reflectors, which reduces cost and simplifies the structure.

Fifth Embodiment

Figure 7:
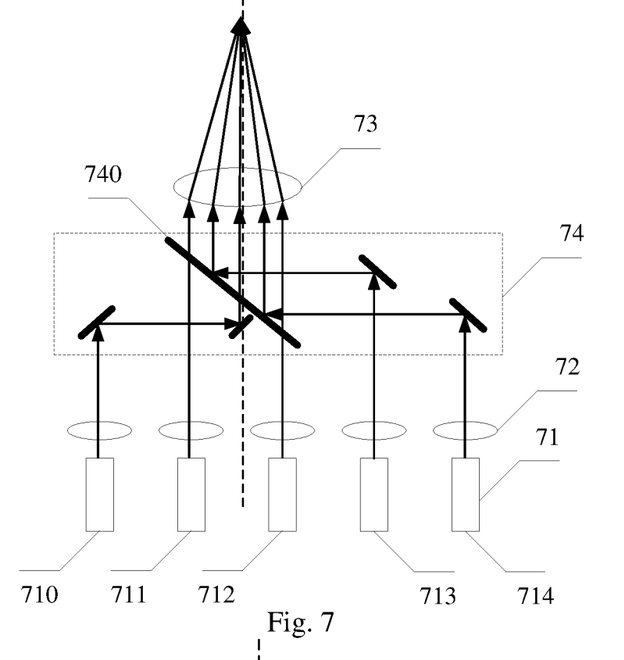
FIG. 7 illustrates the structure of a light source module according to a fifth embodiment of the present invention.

This embodiment provides a light source module, as shown in FIG. 7, which includes a light source array 71, a lens array 72 corresponding to the light source array 71, where each lens of the lens array 72 corresponds to one light source of the light source array 71 to condense and collimate the output light of the light source. The light source module of this embodiment further includes a focusing lens 73 that partially covers the light source array 71 and the lens array 72, and a reflector array 74 located between the focusing lens 73 and the lens array 72, where the reflector array 74 includes multiple reflectors and polarizing filters.

In this embodiment, at least one reflector and one polarizing filter are provided on the output beam path of each light source that is not covered by the focusing lens 73. Further, all polarizing filters on the beam paths that have polarizing filters are the same polarizing filter 740, which is located in an area covered by the focusing lens 73. Of course, in other embodiment, different polarizing filters may be used for different beam paths, but relatively speaking, using a single polarizing filter as in this embodiment saves cost and simplifies the structure.

Further, in this embodiment, the light sources covered by the focusing lens 73 are two adjacent light sources 711 and 712. Of course, in other embodiment, the focusing lens 73 may cover only a single light sources; but compared to covering only a single light source, the light source module in this embodiment reduces the number of reflectors, further saves cost and simplifies the structure.

Figure 8:
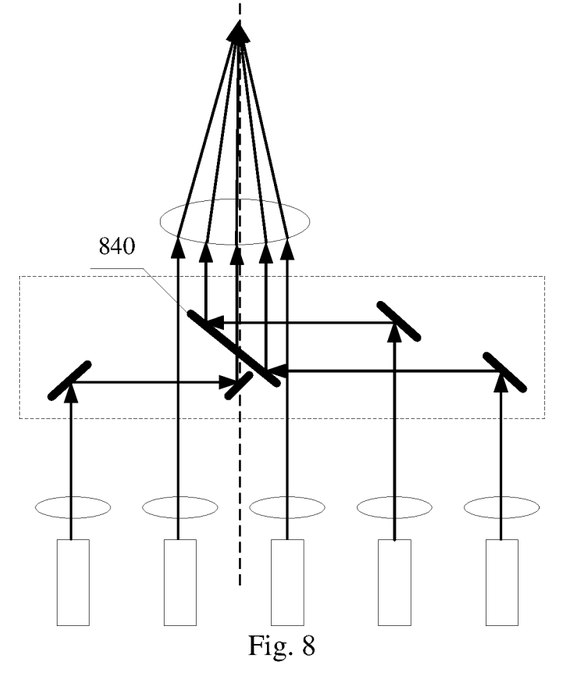
FIG. 8 illustrates the structure of the light source module of the fifth embodiment using another polarizing filter.

In this embodiment, only one polarization filter 740 is used, and it is located in the area covered by the focusing lens 73, between the focusing lens 73 and the light sources 711 and 712, so the output beams of the light sources 711 and 712 also passes through the polarization filter 740 before entering the focusing lens 73. Of course, in other embodiments, the output beams of the light sources 711 and 712 may directly enter the focusing lens 73 without passing through the polarization filter 740, which can be achieved by changing the size of the polarization filter 740, as shown by the polarization filter 840 in FIG. 8.

Moreover, only one reflector is provided on the output beam path of each light source located on one side of the optical axis of the focusing lens, and two reflectors are provided on the output beam path of each light source located on the other side of the optical axis of the focusing lens. For example, as shown in FIG. 7, one reflector is provided on the output beam path of each of light sources 713 and 714 located on one side of the optical axis of the focusing lens 73; each output beam is reflected by the one reflector onto the polarization filter 740, and reflected by the polarization filter 740 to the focusing lens 73. Two reflectors are provided on the output beam path of the light source 710 located on the other side of the optical axis of the focusing lens 73; the output beam is reflected by the two reflectors onto the polarization filter 740, and transmitted by the polarization filter 740 to the focusing lens 73. Then, the focusing lens 73 focuses all light beams to the desired output direction and position in order to achieve downstream functions of generation of different color converted lights and image display.

In this embodiment, on the output beam path of each of the light source not covered by the focusing lens, at least one reflector and one polarization filter are provided to direct output beams that cannot directly enter the focusing lens into the focusing lens. Because the focusing lens does not need to cover the entire area of the light source array and can still focus all output beams of the light sources, the focusing lens in this embodiment can have a relatively small size, making it more suitable for practical applications in projection devices.

Further, in this embodiment, the light sources covered by the focusing lens are two adjacent light sources, therefore, as compared to the first embodiment, the number of reflectors is reduced, which saves cost and simplifies the structure.

Moreover, as compared to the light source modules of FIG. 2, the height of the reflector array in this embodiment is reduced by a half, and the size of the focusing lens is further reduced, making it even more suitable for applications that have strict size requirements.

Sixth Embodiment

Figure 9:
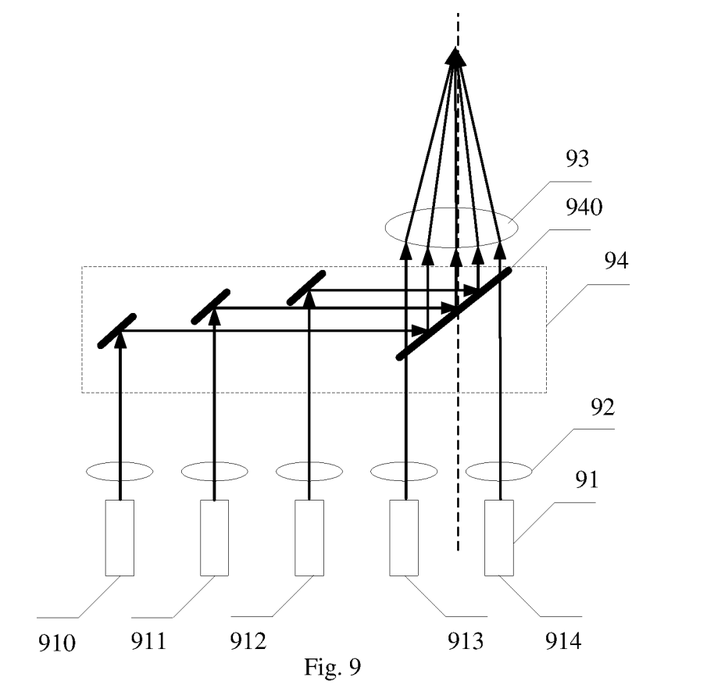
FIG. 9 illustrates the structure of a light source module according to a sixth embodiment of the present invention.

This embodiment provides a light source module, as shown in FIG. 9, where the light source array 91, the lens array 92 corresponding to the light source array 91 and the focusing lens 93 are the same as those in the fifth embodiment. One difference is that in this embodiment, the light sources not covered by the focusing lens 93 are all located on one side of the focusing lens 93. As shown in FIG. 9, the light sources not covered by the focusing lens 93 are light sources 910, 911 and 912 which are located on one side. A reflector and a polarization filter 940 are provided on the output beam path of each of the light sources not covered by the focusing lens 93, and the polarization filter 940 is located in an area covered by the focusing lens 93 to reflect the beams from the light sources to the focusing lens 93. The output beam of the light source covered by the focusing lens 93 may pass through the polarization filter 940 or not pass the polarization filter 940, depending on the size of the polarization filter 940.

In other embodiments, when the output beam of the light source covered by the focusing lens 93 does not pass through the polarization filter 940, i.e., when the size of the polarization filter 940 is changed so the output beams of the light sources 913 and 914 do not pass through the polarization filter 940, the polarization filter 940 may be replaced by a reflector or other optical components having a reflecting function.

Compared to the light source module of the fifth embodiment, the light source module of this embodiment reduces the size of the focusing lens, and at the same time, by placing all the light sources not covered by the focusing lens on one side of the optical axis of the focusing lens, only one reflector is needed on the beam path of each light source not covered by the focusing lens to reflect the beam to the polarization filter and the focusing lens. This reduces the number of reflectors, lowers cost and simplifies the structure.

Seventh Embodiment

This embodiment provides a projection device, which employs the light source module of any of the above embodiments. Compared to conventional projection devices, the light source modules of the projection device of this embodiment is smaller in size, and can satisfy certain applications with strict size requirements, making the projection device more suitable for practical applications.

The various embodiments in this disclosure are described in a progressive manner, where each embodiment is explained by emphasizing its differences from other embodiments. The similar aspects of the various embodiments can be understood by cross reference to each other. Those skilled in the art may make and use the invention based on the above descriptions without undue experimentation. It will be apparent to those skilled in the art that various modification and variations can be made in the light source module and projection device of the present invention without departing from the spirit or scope of the invention. Thus, it is intended that the present invention cover modifications and variations that come within the scope of the appended claims and their equivalents.

What is claimed is:

1. A light source module, comprising:
a light source array including a plurality of light sources, wherein all optical axes of the plurality of light sources are parallel to each other and disposed in a common plane;
a lens array corresponding to the light source array;
a focusing lens covering a partial area of the light source array and the lens array; and
a reflector array located between the focusing lens and the lens array, the reflector array including multiple reflectors and at least one polarization filter separate from the multiple reflectors,
wherein at least one reflector and one polarization filter are located on an output beam path of each light source of the light source array not covered by the focusing lens, wherein the most downstream reflector or polarization filter on each output beam path is located in the area covered by the focusing lens, and wherein each reflector of the reflector array only reflects light form one light source without reflecting or transmitting light from any other light sources.

2. The light source module of claim 1, wherein the focusing lens covers a single light source located in a center area or two adjacent light sources.

3. The light source module of claim 1, wherein the polarizing filters respectively located on the output beam paths of all of the light sources not covered by the focusing lens are the same polarizing filter.

4. The light source module of claim 3, wherein for each light source not covered by the focusing lens and located on one side of the optical axis of the focusing lens, only one reflector is located on the output beam path between the respective light source and the polarizing filter, and for each light source not covered by the focusing lens and located on another side of the optical axis of the focusing lens, two reflectors are located on the output beam path between the respective light source and the polarizing filter.

5. A projection device, comprising the light source module of claim 1.

6. The light source module of claim 4, wherein two first reflectors respectively located on the output beam paths of two light sources, the two light sources being not covered by the focusing lens and being located symmetrically about an optical axis of the focusing lens, are located symmetrically about the optical axis of the focusing lens.

7. The light source module of claim 6, wherein a diameter of the focusing lens is between 6 mm and 7 mm.

* * * * *